3,226,211
INHIBITING GROWTH OF MICROORGANISMS IN FUEL COMPOSITIONS
John F. Deffner, McKees Rocks, and Elizabeth L. Fareri, Pittsburgh, Pa., assignors to Gulf Research & Development Company, Pittsburgh, Pa., a corporation of Delaware
No Drawing. Filed May 29, 1962, Ser. No. 198,457
8 Claims. (Cl. 44—70)

This invention relates to inhibiting growth of slime-promoting microorganisms in the presence of hydrocarbon distillate fuels.

Previous investigations have indicated that microorganisms can be a primary cause of deposit formation in the water bottoms of jet fuel storage tanks. The microorganisms tend to emulsify fuel and water and form semisolid residues or slimes, which hold the microorganisms themselves, living and dead, and their by-products, rust particles, and other minute debris in suspension. These slimes or residues, in turn, can plug aircraft fuel filters and foul aircraft tank gauges, and otherwise interfere with normal use of the fuel. They also are considered to contribute to wing tank corrosion in aircraft by effectively holding water in contact with the tank skin.

A wide variety of microorganisms, including aerobic and anaerobic bacteria, actinomycetes and fungi of types known to inhabit soil, fresh water and salt water, and some of whose spores are even airborne, have been found to subsist in jet fuel tank bottoms. These microorganisms appear to require water for life and to thrive at the oil-water interface, but under proper conditions can extend well into the fuel phase. Although microorganisms capable of subsisting upon a variety of petroleum hydrocarbon fractions have been known for some time, the problem has become serious with the advent of jet aircraft, as the kerosene-grade petroleum fractions employed as jet fuels, i.e., aviation turbine fuels, tend to entrain relatively larger proportions of water and to form more stable suspensions of water than other fuel fractions. Contamination of jet fuel by microorganisms is also a relatively more serious problem, since a greater number of varieties of microorganisms seem to show a preference for the hydrocarbons that are contained in jet fuels. In addition, the problem is more serious for jet fuels than for other fuels at any given level of contamination because of the very high rates of fuel consumption by jet aircraft.

It has been proposed to avoid fuel contamination with microorganisms by taking precautions to ship only clear, essentially dry fuels from the refineries and to keep fuel lines and tankage free from water bottoms and rust. This procedure is not entirely satisfactory, however, as the low spots in flat bottom tanks can never be drained completely, and as air that enters the tankage through atmospheric vents continually introduces additional moisture into the fuel through condensation of atmospheric moisture. It has also been proposed to alleviate microbial fuel contamination by the use of biocidal substances. For example, borax has been proposed for addition to contaminated water bottoms in fuel tanks. Unfortunately, borax has not been found especially effective in practical concentrations against the kinds of microorganisms present in jet fuel tank bottoms. Other materials also have been found unsuitable because of adverse effects on the metals forming the fuel system and engine parts, e.g., rust and corrosion, or upon the fuel properties, e.g., sulfur content, gum-forming tendencies, water separability, acid number, thermal value, dielectric constant, particulate matter content, or the like.

The present invention relates to inhibiting growth of microorganisms in distillate hydrocarbon fuels, such as jet fuels, whereby problems of malfunctioning of fuel systems and corrosion attributable to such microorganisms are markedly reduced or alleviated without adversely affecting other factors governing the quality of the fuel. We have found that the growth of microorganisms in fuel-containing systems can be inhibited by incorporating in the fuel, or in a water phase in contact with such fuel, a small amount of a member of the group consisting of alkylidene diacylates where the alkylidene and acylate substituents contain 1 to 4 carbon atoms each, and the present invention includes fuel oils so inhibited either in or out of contact with contaminated water phase, as well as the process of treating contaminated, binary fuel-water systems. Ethylidene diacetate is an example of a preferred material. Examples of other such materials are butylidene, propylene, and methylene, diformates, diacetates, dipropionates, and dibutyrates. The biocidal materials referred to can be introduced into the contaminated fuel-water system either as such, by direct addition to individual fuel storage systems, or in the form of a solution of suspension in the fresh fuel supplied to the storage facilities, or in other ways.

When the biocidal materials are added to individual fuel storage systems or tanks containing contaminated water some biocidal effect will be noted at concentrations of as little as one percent, based on the weight of the water bottoms of the tank, but we prefer to employ the disclosed materials in amounts of at least two percent based on the weight of the water bottoms. For tank treating purposes, it has been found that the volume of water bottoms in a system that is essentially uncontrolled will ordinarily be about one-half of one percent of the tank volume, although in extreme cases the water bottoms may run as much as about 2.5 percent or more of the tank volume. Thus, in a conventional domestic installation, a 275 gallon storage tank may be found to contain about 0 to 5 gallons of water bottoms.

When the antimicrobial agents described herein are added to the fuel before storage in a contaminated or potentially contaminable system, it is desirable to employ such agents in the fuel in proportions equivalent to at least about one percent and preferably at least two percent of the addition agent based on the weight of the water bottoms that will be contacted with the treated fuel. Thus, there will normally be added to the fuel at least 0.005 percent, and preferably at least 0.01 percent by weight of the fuel of the antimicrobial agent. The herein-disclosed antimicrobial agents can be added in any effective amounts greater than those described above, up to the limit of solubility in the fuel and in the water bottoms, that will not adversely affect the combustion characteristics, corrosiveness, gum-forming tendencies, water separability, acid number, sediment content, and other factors affecting the quality of the fuel. As a practical matter, no additional advantages normally will be obtained from the standpoint of biocidal activity by the use of amounts in excess of about six percent by weight of the water bottoms or 0.05 percent by weight of the fuel, but greater amounts can be used.

In basing the proportionss of antimicrobial agents upon the weight of the fuel or the weight of the water bottoms, we do not mean to imply that the amount indicated necessarily remains entirely in the oil or the aqueous phase. The antimicrobial agents of this invention are appreciably soluble in both the oil and water phases and therefore will be expected to partition themselves between both phases of a fuel-water binary system.

The biocidal agents disclosed herein can be incorporated in the fuel oils before or after contact with a source of microbial contamination, and they can be employed either as such or in admixture with compatible diluents, solvents or blending agents that do not materially impair the biocidal action of the agents. For example, they can be employed with 0.05 to 0.15 percent by weight of the fuel of an antiicing agent containing a 9:1 weight ratio mixture of ethylene glycol monomethyl ether and glycerol.

The effectiveness of the herein-disclosed agents for the purposes of this invention was demonstrated by testing in the presence of fuel oil microorganisms. Thus, eight microorganism isolates—each possibly containing several related but distinct genera and/or species of microorganisms—considered representative of the microbiological flora of jet fuel, were prepared from contaminated jet fuel samples obtained from a number of storage installations. These eight isolates, or microorganism groups, were generally classified as follows: green fungus, brown fungus, grey fungus, yellow-green fungus, black fungus, opaque bacterium, mucoid bacterium, and transparent bacterium. Five to seven-day cultures of the fungi and two- to three-day cultures of the bacteria were streaked on Sabouraud's agar and nutrient agar plates, respectively. Filter paper discs 12.7 mm. in diameter were moistened with about 0.2 ml. of ethylidene diacetate and placed on each agar plate, and the plates were incubated at 25° C. for a period of five to seven days for the fungi and two to three days for the bacteria. The effectiveness of the compound in preventing the growth of microorganisms was determined by examining the zones of inhibition which appeared as clear areas within which no growth occurred. The degree of inhibition in each zone was rated according to the following scale: 0=none, ±=very slight, +=poor, ++=fair, +++=good, ++++=excellent.

ous tank bottoms from furnace oil tanks. The flask was stoppered with a cotton plug and stored at room temperature in the dark. The sample was examined once each week for 60 days, and the amount of growth rated according to the following scale: 0=none, ±=questionable, +=slight, 2+=fair, 3+=good, 4+=excellent. The test is terminated at 4+ growth rating or 60 days. The results were as follows:

|  | Microbial growth |
|---|---|
| Control | 4+ |
| Ethylidene diacetate, 2% by wt. of broth | 0 |

In a practical embodiment, 75.7 grams of ethylidene diacetate is added to the fill line of a 275 gallon tank of furnace oil falling within the specifications of a No. 2 fuel oil and containing approximately one gallon of water bottoms contaminated with deposit-promoting microorganisms, and the two liquids are maintained in contact—with normal fuel withdrawal—for a period of time sufficient to inhibit growth of the microorganisms. After 11 days at ambient conditions, a period normally sufficient to permit vigorous microbial growth, no growth is observed.

In still another embodiment, ethylidene diacetate in the form of a concentrated fuel oil solution is metered into a refinery stream of a No. 2 fuel oil in a proportion sufficient to produce a concentration of 0.05 percent ethylidene diacetate by weight of the fuel oil. The oil is then directed into a tank containing contaminated water bottoms. Thereafter microbial growth in the water bottom is terminated and maintained indefinitely at a low level by intermittent introduction of fresh, inhibited fuel oil to the tank to replace normal withdrawals.

In still another embodiment, there is added to a 50,000

|  | Green Fungus | Brown Fungus | Gray Fungus | Yellow-Green Fungus | Opaque Bac. | Mucoid Bac. | Transparent Bac. | Black Fungus |
|---|---|---|---|---|---|---|---|---|
| Ethylidene Diacetate | +++ | ++ | ++++ | ++++ | ++ | ++++ | ++++ | ++++ |
| Borax g | ± | ++ | ++ | ± | ± | ++ | 0 | + |

The effectiveness of the herein-described materials for the purposes of the present invention was further demonstrated by dissolving ethylidene diacetate in separate samples of nutrient broth and Sabouraud's broth in amounts sufficient to produce solutions containing 20,000 p.p.m. (2%) ethylidene diacetate. Separate 50 ml. samples of the inhibited nutrient media were placed in 125 ml. Erlenmeyer flasks and each flask was inoculated with 0.1 ml. broth cultures of jet fuel microorganisms, the nutrient broth being inoculated with the bacteria and the Sabouraud's broth with the fungi. Because of the general uniformity of the qualitative tests with the eight isolates previously mentioned, only four of the isolates were employed in these tests. The flasks were incubated at 25° C. for 28 days. The cultures were rated in accordance with the following scale: 0=no growth, +=growth. The results of the tests were as follows:

| | Growth after 28 Days | | | |
|---|---|---|---|---|
| | Opaque Bacterium | Transparent Bacterium | Brown Fungus | Gray Fungus |
| Ethylidene Diacetate, 20,000 p.p.m | + | 0 | 0 | 0 |
| Borax, 60,000 p.p.m | + | + | + | + |

The effectiveness of the herein-disclosed biocidal agents was further demonstrated by adding one gram of ethylidene diacetate to a 300 ml. sample of a furnace oil falling within the specifications of a No. 2 fuel oil, and adding the treated oil sample to a flask containing 50 ml. of sterile mycophil broth; the mixture in turn was inoculated with a mixed culture of microorganisms taken from aqueous gallon tank of aviation turbine fuel containing contaminated water bottoms in the amount of about 250 gallons, approximately 43 pounds of ethylidene diacetate.

The invention is not limited to the alkylidene acylates utilized in the specific embodiments described herein, as good results will also be obtained by the use of other biocidal materials indicated herein in the same or equivalent proportions. For example there can be used propylidene and methylene diformates, diacetates, and dipropionates.

If desired, the herein-disclosed biocidal materials can be added to the fuel oils or fuel oil storage systems in admixture with other water and/or oil-soluble agents such as antiicing agents, corrosion inhibitors, sequestering agents, oxidation inhibitors, antifoam agents, combustion improvers, and/or other agents adapted to improve one or more properties of the oil.

Jet fuels, that is, aviation turbine fuels, are defined in tentative specification D-1655-59T of the ASTM Standards on Petroleum Products and Lubricants. No. 2 fuel oils are defined in ASTM tentative specification D-396-61T.

In view of the broad spectrum of biocidal activity shown by the herein-disclosed agents, it is contemplated that these agents will also be effective to destroy microorganism growth in other hydrocarbon-water systems. For example, the agents disclosed herein can be employed in biocidal amounts in the oil-water systems involved in cutting oil compositions and fire-resistant hydraulic fluids, to prevent growth of microorganisms therein.

Obviously, numerous modifications of the invention described hereinabove can be resorted to without departing from the spirit or scope thereof. Accordingly, only such

We claim:

1. A fuel composition, comprising a major amount of a liquid hydrocarbon fuel oil to which has been added about 0.01 to 0.05 percent by weight of an alkylidene diacylate, where the alkylidene and acylate radicals each contain 1 to 4 carbon atoms.

2. The fuel composition of claim 1 where the fuel is an aviation turbine fuel.

3. The fuel composition of claim 1 where the fuel is a No. 2 fuel oil.

4. The fuel composition of claim 1 where said member is ethylidene diacetate.

5. A binary liquid system comprising a predominant proportion of a liquid hydrocarbon fuel oil in contact with a relatively small amount of an aqueous phase, at least one of said fuel and said aqueous phase being contaminated with microorganisms, said system containing about 2 to 6 percent by weight of the aqueous phase of an alkylidene diacylate, where the alkylidene and acylate groups each contain 1 to 4 carbon atoms.

6. The binary liquid system of claim 5 where the fuel is an aviation turbine fuel.

7. The binary liquid system of claim 5 where the fuel is a No. 2 fuel oil.

8. The binary liquid system of claim 5 where said member is ethylidene diacetate.

References Cited by the Examiner
UNITED STATES PATENTS

| | | | |
|---|---|---|---|
| 2,319,481 | 5/1943 | Stillman et al. | 260—347.4 |
| 2,840,503 | 6/1958 | Whetstone et al. | 167—39 |
| 2,975,042 | 3/1961 | Summers | 44—56 |
| 2,975,043 | 3/1961 | Ambrose | 44—72 |

DANIEL E. WYMAN, *Primary Examiner.*